July 14, 1931.   L. C. HARDESTY   1,814,799
MOTOR CONTROL SYSTEM
Filed Dec. 18, 1928
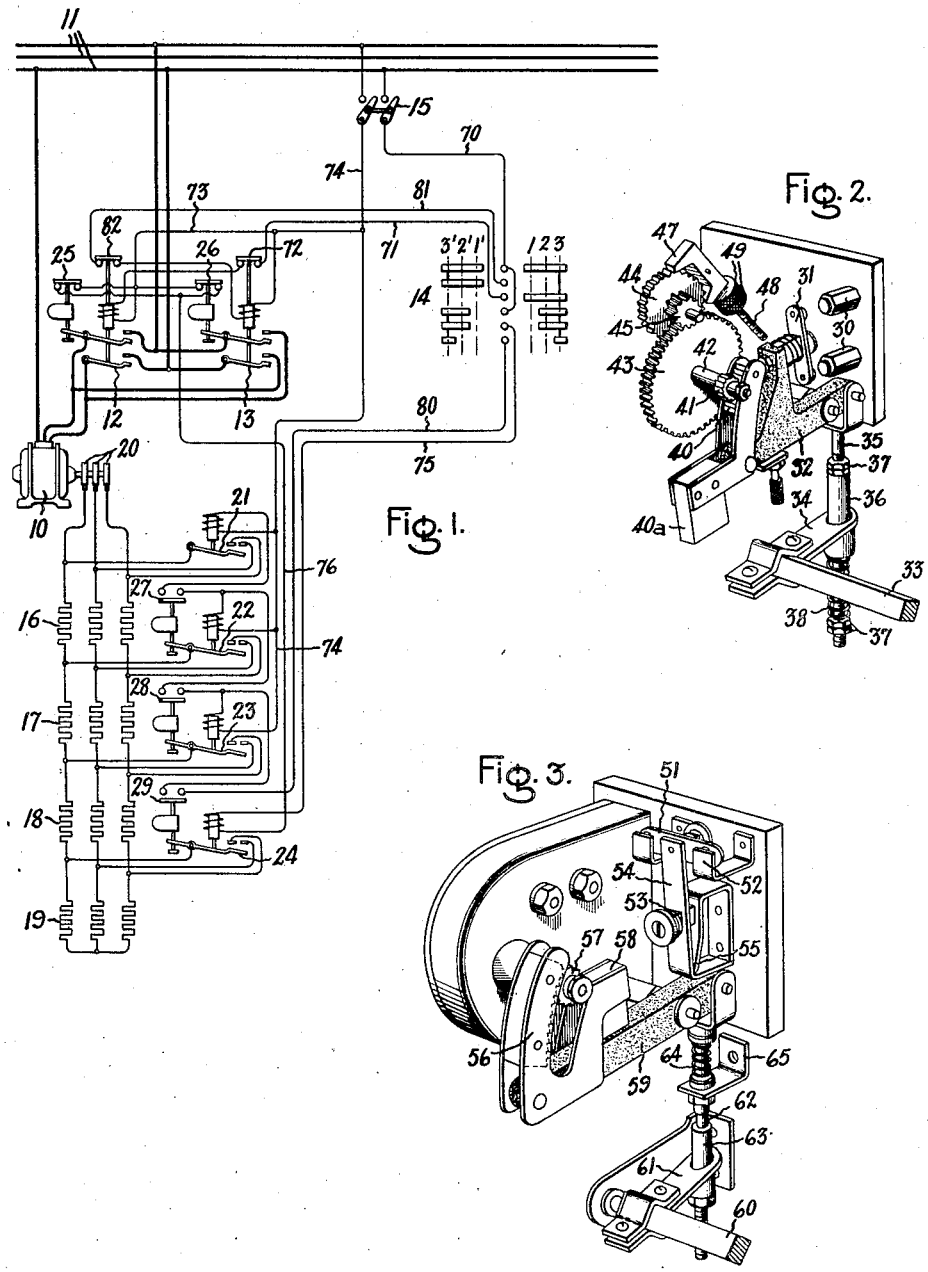
Inventor:
Llewellyn C. Hardesty,
by Charles E. Tulla
His Attorney.

Patented July 14, 1931

1,814,799

UNITED STATES PATENT OFFICE

LLEWELLYN C. HARDESTY, OF SCOTIA, NEW YORK, ASSIGNOR TO GENERAL ELECTRIC COMPANY, A CORPORATION OF NEW YORK

MOTOR CONTROL SYSTEM

Application filed December 16, 1928. Serial No. 326,722.

My invention relates to control systems for electric motors, more particularly to control systems for reversible electric motors and has for its object the provision of a reliable, simple and efficient system of control whereby the current of the motor will be automatically limited when the motor is "plugged" by being reversed while running.

Although it obviously has other applications, my invention is particularly useful in connection with hoisting equipments and like apparatus, the direction of rotation of which must be very frequently reversed.

In many installations wherein a frequent reversal is necessary it has been the practice to reverse the operating motor while it is running. This method of reversing the motor is advantageous in that it is conducive to a great saving of time since a strong decelerating torque is maintained down to and through the point of reversal. Thus, the motor will be reversed in much less time than is the case with other well known methods of control. It has the disadvantage, however, that the motor will draw a very large current during the reversing operation with the result that often times the decelerating torque is entirely too great. Thus, if an induction motor be plugged while the motor is running, the plugging current and hence the plugging torque may rise to 400 or 500 per cent of the normal values. Likewise, if the voltage impressed upon the armature of a direct current motor be reversed while the motor is running, the voltage existing momentarily across the armature may be nearly twice the line voltage with the result that the plugging current peak will rise to relatively large values.

In order to restrict the current drawn by an induction motor during the plugging operation, suitable resistance has been provided in the secondary of the motor, this resistance being relatively large as compared with the usual secondary starting resistance. Likewise, the current drawn by a direct current motor during the plugging operation is limited by suitable resistance inserted in the armature circuit, this resistance also being relatively large as compared with the usual starting resistance. These plugging resistances should be controlled so that they will not be inserted when the motor is being accelerated from rest but will be inserted instantly in the event the motor is plugged. Moreover, these resistances should be excluded from their respective circuits as the motor stops and accelerates in the reverse direction so that the motor may accelerate rapidly to its full speed in this direction. It will be understood that plugging as practiced with suitable plugging resistors together with features for preventing too rapid short circuiting of these resistors is an entirely commendable practice.

My invention in one of its aspects, therefore, contemplates the provision of a control system for an electric motor whereby the plugging resistor will be inserted in the event the motor is being plugged and, furthermore, will be short circuited as the motor comes to a stop and accelerates in the reverse direction. Moreover, the resistor will be short circuited when the motor is accelerated from rest.

In carrying out my invention in one form thereof, I provide suitable means for controlling the plugging resistor responsively to the plugging operation and to a time interval so that when the motor is plugged, the plugging resistor will be included for a predetermined interval of time. Moreover, I arrange the control means so that the resistor will be short circuited automatically when the motor is being started from rest.

For a more complete understanding of my invention, reference should be had to the accompanying drawings in which Fig. 1 is a diagrammatic representation of a system of electrical control embodying my invention; Fig. 2 is a perspective view of one of the time element switch mechanisms employed in carrying out my invention; and Fig. 3 is a perspective view of another of the time element switch mechanisms employed in carrying out my invention.

Referring to the drawings, I have shown my invention in one form in connection with an alternating current induction motor of the wound-rotor type provided with suitable speed controlling resistors and with a "plugging" resistor which will be connected to limit the current drawn by the motor while it is being "plugged". It will be understood that the induction motor 10 is provided with a three phase primary winding on its stator member together with a three phase secondary winding on its rotor member. It is believed unnecessary, for a proper understanding of this invention, to illustrate in detail the disposition of these windings since any preferred well known arrangement may be employed.

A suitable three phase alternating current source of supply 11 is provided for the motor 10. In order to control the power connections for the motor so that it may be conveniently started, stopped and reversed, suitable switches 12 and 13, shown as electroresponsive switches, are interposed in the connections leading to the induction motor from the alternating current supply source. The energizing coils for these switches will be placed under the control of a suitable master switch 14. Thus, as will be readily understood, the starting, stopping and reversing the motor will be under the direct control of the master switch. It will be understood that a suitable line switch 15 will be interposed between the electrical supply source 11 and the master controller 14.

In order to control the speed of the motor and further to limit the current peak during the plugging operation, suitable speed controlling resistors 16, 17 and 18 and a suitable plugging resistor 19 of relatively large value as compared with the speed controlling resistors are connected in series relation with each other and with the three phase secondary winding mounted on the rotor member. As shown, suitable slip rings 20 are provided on the rotor member to which are connected the leads from the resistors. The accelerating resistors 16, 17 and 18 are provided respectively with speed controlling contactors 21, 22 and 23 while the plugging resistor is provided with a controlling contactor 24.

In order to properly control the plugging resistor 19 so that it will be inserted in the secondary for a predetermined interval of time when the motor is being plugged and will be excluded from the secondary when the motor is being accelerated from rest, I energize the contactor 24 responsively to the operation of the directional contactors 12 and 13 and a time interval. As shown, the energizing circuit for the operating coil of the contactor 24 will be placed under the control of suitable time element switching mechanisms 25 and 26 which in turn will be controlled by the reversing switches 12 and 13, respectively. It will be understood that these timing switches will be opened instantly when the associated directional contactor is closed and will close an interval of time after the associated reversing contactor is opened.

Preferably, the accelerating contactors will be controlled automatically so that they will successively short circuit the accelerating resistors in predetermined intervals of time. To this end I provide suitable time element switches 27, 28 and 29 for controlling the energization of the contacts 21, 22 and 23 respectively. Thus, the timing switch 29 will control the energization of the contactor 23, the timing switch 28 will control the energization of the contactor 22 while the timing switch 27 will control the energization of the contactor 21. In the form of my invention illustrated these timing switches will be controlled by the plugging contactor 24 so that their operation will be initiated when the contactor 24 operates to short circuit the plugging resistor 19. Thus, the timing switch 29 will be operably associated with the contactor 24 so that its operation will be initiated in response to the closing of the switch 24. Likewise, the timing switches 28 and 27 will be operably associated with the accelerating contactors 23 and 22 respectively so that their operation will be initiated in response to the closing of their associated contactor. It will be understood that these timing switches 27, 28 and 29 will be such that they will be open when their associated contactor is open, will be closed a predetermined interval of time after the closing of the contactor and will be opened concurrently with the opening of the contactor. Any suitable time element switch which will have these characteristices may be employed to control the accelerating contactors. Preferably and as shown, I employ that described and claimed in the copending United States application of Robert W. Goff, Serial Number 161,919, filed January 18, 1927, and assigned to the same assignee as this invention. Likewise, any suitable time element switch, which will have the characteristics required by the timing switches 25 and 26, that is, any time element switch which will open instantly when its associated contactor is closed and will be closed in an interval of time after the contactor is opened, may be employed to control the plugging contactor 24. Again I propose to employ the time element switch described in the copending application of Robert W. Goff, referred to above.

One of the timing switches 25, 26 and 27, which are of identical construction, is shown in Fig. 2 of the drawings. Referring to Fig. 2 it will be observed that this switch comprises a pair of suitable contacts 30 which will be inserted in the circuit to be controlled or in a controlling circuit for the circuit to be controlled. In my invention, these contacts of the respective switches will be inserted in the energizing circuits for the succeeding contactors. Thus, the contacts 30 of the switch 29 will be inserted in the energizing circuit for the contactor 23, those of the switch 28 will be inserted in the energizing circuit for the contactor 22 and those of the switch 27 will be inserted in the energizing circuit for the contactor 21.

The bridging contact 31 of the timing switch is yieldingly mounted upon a pivotally mounted switch arm 32. This switch arm is operably connected to the associated main contactor (not shown) by means of the insulated shaft 33. The connection between the switch arm 32 and the shaft 33 is such that when the main contactor is being closed, the shaft 33 will be rotated so as to bias the contact 31 towards its bridging position. To this end the shaft is provided with an operating arm 34 which is mechanically connected to the switch arm 32 by means of a bolt 35 depending from the switch arm. A collar 36 having its upper portion of reduced diameter so as to loosely pass through a cooperating hole in the arm 34 is loosely mounted upon the bolt so as to slide between two sets of lock nuts 37. A compression spring 38 is inserted between the collar and the lower set of lock nuts so that when the shaft is rotated in a clockwise direction, as viewed in the figure, in response to the closing of the main contactor, the spring will be compressed so as to bias the switch arm to bridge the contacts 30.

The switch arm 32 is connected to the timing mechanism by means of the curved or arcuate rack 40 provided on the switch arm. As shown, this arcuate rack cooperates with the ratchet pinion 41 fixedly mounted upon the operating shaft 42 so as to form a one-way driving connection between the switch arm and the operating shaft. It will be understood that the arcuate rack 40 and the pinion 41 will be provided with suitably shaped teeth so that the one-way interlocking connection will be established between them. It will also be understood that the rack 40 will be biased into engagement with the pinion 41 by any suitable means, as for instance, the weight 40a.

The timing mechanism further comprises a gear 43 fixedly mounted upon the operating shaft 42. The escapement gear 44 is mechanically interconnected with the gear 43 by means of a pinion 45 so that when the escapement gear 44 is permitted to rotate, the switch arm 32 will be moved in a clockwise direction under the influence of the biasing spring 38.

The escapement gear 44 is suitably controlled to produce a time delay action by means of a double acting pendulum pawl 47, which is pivotally mounted adjacent the escapement gear so as to cooperate with the teeth formed on the periphery thereof. The pawl 47 is provided with a pendulum like extension 48 which is provided with adjusting nuts 49 mounted thereon so that the pendulum timing action may be readily varied. It will be understood that the engaging surfaces of the pawl 47 and the teeth of the escapement gear 44 will be so shaped that the timing mechanism will be always self-starting whenever a rotatable force is applied to the escapement gear. Thus, when a strain is set up in the spring 38, the switch arm 32 will be moved to its bridging position in an interval of time dependent upon the setting of the timing mechanism, it being understood that the retarding action of the timing mechanism may be readily varied either by adjusting the position of the nuts 32 or by adjusting the compression of the spring 38, or by making both of these adjustments.

The timing switches 25 and 26 both of which are identical in construction are illustrated in perspective view in Fig. 3 of the drawings. This timing mechanism is essentially the same as that described in Fig. 2 but, as stated, is arranged to be closed when the main contactor is open, to be opened immediately upon the closure of the main contactor and to be reclosed a time interval after the opening of the main contactor. In this construction the bridging contact 51 is biased out of engagement with the upturned ends of the stationary contacts 52 by means of the biasing spring 53 which operates upon the L-shaped contact support 54. As shown, the support 54 is fulcrumed at its lower end upon the knife edge bearing 55. The curved or arcuate rack 56 operates upon the ratchet pinion 57 and is biased into engagement therewith by means of the weight 58. The teeth on the rack 56 are sloped oppositely from the teeth on the rack 40 of Fig. 2 so that the upward movement of the rack is free and unrestricted while a one-way locking connection is established with the teeth on the ratchet pinion 56 upon downward movement of the rack. It will be understood that the pinion 57 will serve, as does the pinion 41 of Fig. 2, to mechanically interconnect the moving contacts of the switch to the retarding mechanism.

The switch arm 59 is mechanically interconnected with the rotatable shaft 60 which will be operated in a clockwise direction, as viewed in the figure, in response to the closing of the associated main contactor (not shown) and in a counter-clockwise direction in response to the opening of the main contactor. Thus, the switch arm 59 will be connected to the shaft by means of the arm 61, the bolt 62 and the collar 63. However, in this case the spring 64 will be interposed between the switch arm and a stationary support 65 in order to bias the switch arm into engagement with the lower end of the L-shaped member 54 carrying the bridging contact member 51.

It will be understood that the retarding mechanism of this switch is identical with that shown in Fig. 2. Thus, when the shaft 59 is rotated in a clockwise direction, as viewed in the figure, in response to the closing of its associated main contactor, the arm 61 will engage the shoulder on the collar 63 and rotate the switch arm 59 out of engagement with the lower end of the L-shaped member 56. This movement of the switch arm 59 is unretarded and will occur simultaneously with the closure of the main contactor since the rack gear 56 will ride freely over the ratchet pinion 57 as the rack is raised. Disengagement of the switch arm 59 from the lower end of the L-shaped member 54 permits the spring 53 to immediately move the bridging contacts 51 out of engagement with the stationary contacts 52.

When the shaft 60 is rotated in a counter-clockwise direction in response to the opening of the main contactor, the arm 61 readily slides up the reduced portion of the collar 63 thereby permitting the biasing spring 64, which will have been compressed when the rack was raised to its upper position, to return the rack to its lower position, shown in Fig. 3. Thus, the biasing spring will return the rack to its initial position in which it is shown in the drawing under the retarding influence of the time delay mechanism. The action of the time delay mechanism is exactly the same as previously described in connection with the mechanism of Fig. 2 and the adjustment thereof to vary the time interval required to effect reclosure of the bridging contact is made in a similar manner.

In operation it will be understood that the motor will be started and accelerated from rest in either direction by appropriate movement of the master switch 14. Thus, movement of the master switch toward the left, as viewed in the figure, will complete an energizing circuit for the forward contactor 12 from the lower conductor of the supply source through the line switch 15, the conductor 70, the first finger of the master controller, the third finger of the master controller, the conductor 71, the electrical interlock 72 operated by the contactor 13, the operating coil of the contactor 12, the conductor 73 and thence through the conductor 74 to the upper conductor of the supply source. As a result of this operation, the contactor 12 will be closed and its associated timing switch 25 will be opened immediately. On the first point of the controller 14, therefore, the motor 10 will be energized with all of the accelerating resistors 15, 16 and 17 and the plugging resistor 19 connected in series with the secondary winding of the motor.

In order to accelerate the motor, the controller 14 will be moved to its second forward position 2 in which position the controller will complete an energizing circuit for the plugging contactor 24 from the lower conductor of the supply source through the line switch 15, the conductor 70, the first finger of the controller, the fourth finger of the controller, the fifth finger of the controller, the conductor 75, the operating coil of the contactor 24, the conductor 76, the closed timing switch 26, the conductor 73 and thence through the conductor 74 to the upper conductor of the supply source. Upon the completion of this circuit, the contactor 24 will be closed so as to short circuit the plugging resistor 19. Immediately upon the closing of the contactor 24, the operation of the timing switch 29 will be initiated. After the controller 14 has been moved to its third forward position 3, the timing switch 29, upon closing, will complete an energizing circuit for the operating coil of the accelerating contactor 23 from the last finger of the controller through the conductor 80, the closed timing switch 29, the operating coil of the contactor 23 and thence through the return conductor 74 to the upper conductor of the supply source. The accelerating contactor 23 in closing, short circuits the accelerating resistor 18 and at the same time initiates the operation of the timing switch 28 which when closed will complete an energizing circuit for the accelerating contactor 22 to short circuit the accelerating resistor 17. In like manner, the timing switch 27 will effect an energization of the accelerating contactor 21 which will close to short circuit the resistor 16. Thus, it will be observed that when the controller is moved to its third forward position the forward contactor 12 will be closed to complete an energizing circuit for the motor, the plugging resistor 19 will be excluded from the secondary circuit and the accelerating resistors 16, 17 and 18 will be successively excluded from the secondary circuit in intervals of time dependent upon the setting of the timing switches 27, 28 and 29.

Should it be desired to reverse the motor while it is running in a forward direction, the controller 14 will be thrown toward the right, as viewed in the figure, to its third reverse position $3^1$. This operation of the controller will effect a deenergization of the forward contactor 12 and will effect an energization of the reversing contactor 13. The energizing circuit for the reversing contactor 13 may be traced from the lower conductor of the supply source, through the line switch 15, the conductor 70, the first finger of the controller, the second finger, the conductor 81, the electrical interlock 82 operated by the forward contactor 12, the operating coil of the reverse contactor 13 and thence through the conductor 74 to the upper conductor of the supply source. It will be understood that the electrical interlocks 72 and 82 perform the usual function of preventing energization of the other directional contactor when one of these contactors is energized.

It will be observed that when the reversing contactor 13 is closed, the timing switch 26 associated therewith will be opened immediately. It will also be observed that immediately upon the opening of the forward contactor 12, the operation of the timing switch 25 will be initiated so that this switch will close in a time interval depending upon the adjustment of the mechanism. Thus, since both of the switches 25 and 26 will be open, it will be impossible to energize the plugging contactor 24 until the timing switch 25 has been closed. This operation of the timing switch 25, therefore, not only insures that the plugging resistor 19 will be connected in the secondary circuit but also prevents the operation of the accelerating contactors so that in addition to the plugging resistor, the accelerating resistors 16, 17 and 18 will be included in the secondary of the motor.

As is well understood by those skilled in the art, when the controller 14 is thrown from its third forward position 3 to its third reverse position $3^1$, the motor will slow down under the influence of a retarding torque, the value of which will depend upon the resistance in the motor secondary, after which it will speed up in the reverse direction. It will be understood that the plugging resistor 19 will be short circuited substantially at the instant the motor has come to rest. Thus, the motor may be accelerated quickly in the reverse direction by the successive short circuiting of the accelerating resistors, as previously explained. It will be understood, however, that the timing switches 25 and 26 may be adjusted to close in any desired interval of time. Likewise, the accelerating timing switches may be adjusted to close in any desirable interval of time.

It will be understood, of course, that the motor will be accelerated from rest in the reverse direction by movement of the controller to its positions $1^1$, $2^1$ and $3^1$. As is the case when the motor is being accelerated in its forward direction, the plugging resistor 19 will be short circuited and the accelerating resistors 18, 17 and 16 will be successively short circuited in this order.

It will be obvious that the timing switches 25 and 26 may be associated with the reversing contactors of a direct current motor substantially in the manner described in connection with the induction motor 10. Thus, the timing switches may control suitable resistances in the motor armature circuit to limit the current drawn by the motor during the plugging operation.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A system of motor control comprising a reversible alternating current induction motor having a secondary winding, a pair of reversing switches for said motor, a resistor connected to be inserted in said secondary winding, switching mechanism for controlling said resistor and a pair of time element switching mechanisms for controlling the latter switching mechanism each being operated responsively to the operation of one of said reversing switches so that said resistor is inserted in said secondary winding for a predetermined interval of time upon said reversing switches being operated to reverse said motor while running and is short circuited upon either of said switches being operated to accelerate said motor from rest.

2. A system of motor control comprising an alternating current induction motor of the wound-rotor type, switching mechanism for controlling the direction of operation of said motor, speed controlling resistors connected to be included in series with the rotor circuit of said motor, time element switching mechanism for controlling said resistors whereby said resistors are successively short circuited in predetermined intervals of time, a resistor of relatively large value connected to be included in series with said speed controlling resistors and second time element switching mechanism for controlling said first time element switching mechanism and said latter resistor whereby upon said motor being reversed while running said first time element switching mechanism is rendered inoperative so that said accelerating resistors together with said latter resistor are connected in series with said rotor winding for a predetermined interval of time and whereby upon said motor being accelerated from rest said latter resistor is excluded.

3. The combination with an alternating current induction motor having a secondary winding, of a pair of reversing contactors for said motor, a resistor connected to be included in series with said secondary winding, a pair of time element switches each of which is under the control of one of said reversing contactors, said switches being opened instantly upon its associated contactor being closed to energize said motor and being closed in a predetermined interval of time upon the associated contactor being opened and electrical connections controlled by said timing switches whereby when either of said timing switches is opened said resistor may be excluded from the secondary circuit and whereby when both of said timing switches are opened said resistor is included in series with said secondary winding.

4. A system of electrical control comprising an alternating current induction motor of the wound-rotor type, a pair of electro-responsive switches for controlling the direction of operation of said motor, a master control switch for said electroresponsive switches, a plugging resistor, a pair of time element switches each under the control of one of said directional switches and electrical connections controlled by said timing switches whereby said plugging resistor is connected in series with said rotor winding for a predetermined interval of time upon said motor being reversed while running and said plugging resistor is excluded upon said motor being accelerated from rest.

5. An electrical control system comprising a reversible electric motor, reversing control means for said motor, current limiting means for said motor, and means for controlling said current limiting means comprising a pair of time element switches operably associated with said reversing controlling means so that when forward connections are established one of said switches is operated and when reverse connections are established the other of said switches is operated, and electrical connections controlled by said time element switches so that when said motor is reversed while running said current limiting means is rendered effective for a predetermined interval of time but when said motor is started from rest in either direction said current limiting means is rendered ineffective immediately.

6. The combination with a reversable electric motor, of a pair of switches for controlling the direction of operation of said motor, a resistor for limiting the current drawn by said motor and means for controlling said resistor comprising a pair of definite time element switching devices each under the control of one of said directional switches and electrical connections controlled by said time element switches so that said resistor is connected to limit the motor current for a predetermined interval of time upon said motor being reversed while running and said resistor is excluded upon said motor being started from rest.

7. A system of motor control comprising a variable speed reversable electric motor, a pair of directional control switching mechanisms for said motor, speed adjusting means for said motor, a resistor for limiting the current drawn by said motor and means for controlling said resistor and said speed adjusting means comprising a pair of time element switches each of which is under the control of one of said directional switches, each time element switch being normally closed and open instantaneously upon its associated directional switch being closed to energize said motor and being closed in a predetermined interval of time upon the associated directional switch being opened, electrical connections for said control resistor including said normally closed time element switches so that said resistor is rendered ineffective when said motor is accelerated from rest and is rendered effective for a predetermined interval of time with said motor adjusted for minimum speed in the event said motor is reversed while running.

8. The combination with an alternating current induction motor, of control means for reversing the direction of operation of said motor, speed controlling resistors connected to be included in series with the secondary winding of said motor, a plugging resistor connected to be included in series with said speed controlling resistors and said secondary winding, time element switching mechanism for controlling said speed controlling resistors so that said resistors are successively short circuited in predetermined intervals of time, and means comprising time element switching mechanism for controlling said plugging resistor and said first mentioned time element switching mechanism responsively to the operation of said reversing control means so that said plugging resistor is excluded when said motor is accelerated from rest while upon said motor being reversed while running said first time element switching mechanism is rendered ineffective so that said plugging resistor is connected in circuit with said speed controlling resistors and said secondary winding for a predetermined interval of time.

In witness whereof, I have hereunto set my hand this 17th day of December, 1928.

LLEWELLYN C. HARDESTY.